United States Patent [19]

Hindi et al.

[11] Patent Number: 5,300,552
[45] Date of Patent: Apr. 5, 1994

[54] POLY(ARYLENE SULFIDE) COMPOSITION

[75] Inventors: Majid H. Hindi; Mark W. Woods, both of Bartlesville, Okla.; Nathaniel Harry, Southfield, Mich.; Tomoe Wakida, Ginowan, Japan

[73] Assignee: Phillips Petroleum Company, Bartlesville, Okla.

[21] Appl. No.: 772,732

[22] Filed: Oct. 7, 1991

[51] Int. Cl.$^5$ ............................................. C08K 3/40
[52] U.S. Cl. .................................. 524/494; 524/424; 524/436; 524/437; 524/502; 524/609; 525/189
[58] Field of Search ............... 524/494, 424, 436, 437, 524/609, 502; 525/189, 494

[56] References Cited

U.S. PATENT DOCUMENTS

| | | | |
|---|---|---|---|
| 4,025,582 | 5/1977 | Needham | 260/897 R |
| 4,051,096 | 9/1977 | Koseki | 260/31.8 |
| 4,365,037 | 12/1982 | Adachi | 524/449 |
| 4,529,769 | 7/1985 | Johnson et al. | 524/425 |
| 4,544,700 | 10/1985 | Wright | 524/543 |
| 4,708,983 | 11/1987 | Liang | 525/101 |
| 4,731,390 | 3/1988 | Mizuma | 521/134 |
| 4,992,497 | 2/1991 | Wright | 524/147 |
| 5,079,290 | 1/1992 | Wright | 524/609 |

*Primary Examiner*—Paul R. Michl
*Assistant Examiner*—John J. Guarriello
*Attorney, Agent, or Firm*—Beverly M. Dollar

[57] ABSTRACT

A composition is provided which comprises a poly(arylene sulfide) polymer, fibrous reinforcement, a polyolefin polymer, and optionally at least one other component selected from hydrotalcites, nucleating agents, organosilanes, pigments, plasticizers and fillers. The invention provides a poly(arylene sulfide) composition which exhibits improved mold release characteristics and/or a reduced tendency to flash during injection molding applications.

30 Claims, 1 Drawing Sheet

POLY(ARYLENE SULFIDE) COMPOSITION

This invention relates to poly(arylene sulfide) compositions. In one aspect it relates to poly(arylene sulfide) compositions having improved mold release characteristics. In another aspect it relates to poly(arylene sulfide) compositions exhibiting reduced amounts of flashing when molded.

One important use of poly(arylene sulfide) polymers is in molding compositions. By combining poly(arylene sulfide) polymers with various other compounds like reinforcing agents such as glass fibers and fillers, molding compositions can be tailored for specific end uses.

One problem that has been experienced with some poly(arylene sulfide) compositions during molding is a tendency of the molded parts to adhere to portions of the mold surface. This adherence often requires the use of more force to eject the part from the mold, and may result in poor surface appearance of the molded part. Although it is known to incorporate additives into poly(arylene sulfide)s to improve mold release, no universal additive exists; and the discovery of additives which improve mold release of the polymer while enhancing other properties or at least not adversely affecting other properties would be desirable.

Another problem noted with poly(arylene sulfide) compositions is that they often experience flashing upon molding. Flashing, as used herein, is meant to denote that situation that occurs when molten polymer flows into fine gaps or crevices in the mold, or between sections of the mold, during the molding process. When the molded part is thereafter removed from the mold, the part must be trimmed or otherwise cleaned up to remove the polymer which flashed into the cracks, or out of the molding cavities. This process is time-consuming and therefore adversely affects the economics of the molding process. Often the appearance of the part suffers as well. It would therefore be desirable to have a method of reducing the tendency of poly(arylene sulfide) compositions to flash during molding.

SUMMARY OF THE INVENTION

It is an object of this invention to provide poly(arylene sulfide) compositions having improved mold release characteristics.

It is another object of this invention to provide poly(arylene sulfide) compositions exhibiting reduced amounts of flashing when molded.

According to this invention a poly(arylene sulfide) composition is provided which comprises a poly(arylene sulfide) polymer, 5 to 60 weight percent of a fibrous reinforcing material, and 0.1 and 3 weight percent of a polyolefin prepared from a branched olefin having 4 to 12 carbon atoms, wherein the weight percentages are based on the total weight of the composition.

DETAILED DESCRIPTION OF THE INVENTION

Figure 1:
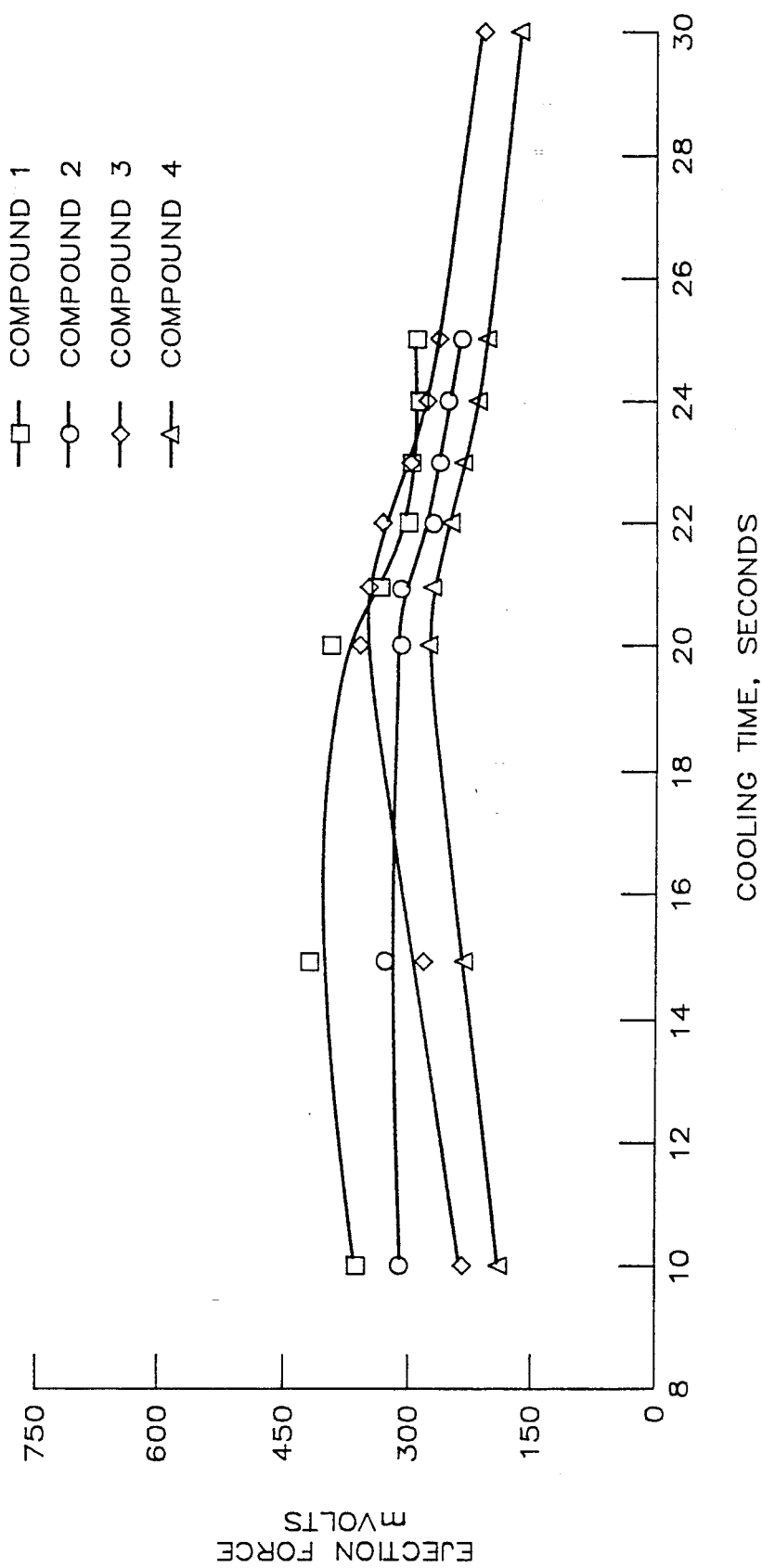
FIG. 1 is a graphical comparison of the mold ejection force required at various cooling times for polymers prepared according to this invention and comparison and control polymers.

The poly(arylene sulfide) polymers useful in this invention are those prepared according to any method known to those of ordinary skill in the art, such as, for example, those disclosed in U.S. Pat. Nos. 3,354,129, 3,919,177, 4,038,261, 4,038,262, 116,947, 4,282,347 and 4,350,810, which patents are hereby incorporated by reference. The poly(arylene sulfide) polymer is generally prepared by contacting reactants comprising a dihalo substituted aromatic compound, a sulfur source and a polar organic compound, optionally in the presence of alkali metal carboxylates and/or polyhaloaromatic compounds, under polymerization conditions.

Examples of poly(arylene sulfide) polymers suitable for purposes of this invention include poly(2,4-toluene sulfide), poly(4,4'-biphenylene sulfide) and poly(phenylene sulfide). Because of its availability and desirable properties (such as high chemical resistance, nonflammability, and high strength and hardness) poly(phenylene sulfide) is the presently preferred poly(arylene sulfide) polymer.

The poly(arylene sulfide) polymers used in this invention can be acid washed during the poly(arylene sulfide) recovery process according to a process similar to that disclosed in U.S. Pat. No. 4,801,664. Any suitable organic or inorganic acid which is water soluble can be used in the acid washing process. Examples of suitable organic acids include, but are not limited to, acetic acid, formic acid, fumaric acid, and monopotassium phthalic acid. The presently preferred organic acid is acetic acid. Examples of suitable inorganic acids include, but are not limited to, hydrochloric acid, monoammonium phosphate, sulfuric acid, phosphoric acid, boric acid, nitric acid, sodium dihydrogenphosphate, and carbonic acid. The presently preferred inorganic acid is hydrochloric acid.

The poly(arylene sulfide) polymers employed in this invention can be subjected to a curing step. Curing is defined herein as a distinct process step after polymer drying comprising a thermal treatment of the polymer in the presence of oxygen-containing atmosphere. The preferred oxygen-containing atmosphere is air. In one curing process, the treatment can be above the melting point for semi-crystalline polymers or alternately, the treatment can be above the glass transition point for amorphous polymers. A second curing process is a solid state process in which the polymer is heated to a temperature up to, but below the melting point of a semi-crystalline polymer or alternately, up to but below the glass transition point of an amorphous polymer. The solid state curing process is currently preferred for curing large quantities of polymer, such as in a commercial process. For example, the solid state curing of poly(phenylene sulfide), which has a melting point of about 540° F., is generally carried out at a temperature of about 350° F. to about 500° F.

For employment as a molding composition, it is generally preferred to use poly(arylene sulfide) polymers which are of relatively high molecular weight and are essentially linear prior to curing. Essentially linear poly(arylene sulfide), as used herein, is defined as a polymer having no branching or such a small amount of branching as to have substantially no effect on the polymer properties. For example, the amount of polyhaloaromatic impurity found in the dihaloaromatic used in the poly(arylene sulfide) polymerization process would not be sufficient to cause the resultant poly(arylene sulfide) to be outside the essentially linear definition.

Essentially linear-high molecular weight poly(arylene sulfide) polymers which can be used in this invention can be prepared by the process described in U.S. Pat. No. 3,919,177, or by any other process known to those of ordinary skill in the art which produces an essentially linear, high molecular weight poly(arylene sulfide) polymer. The preferred high molecular weight poly(arylene sulfide) is poly(phenylene sulfide). The melt flow of the high molecular weight poly(phenylene sulfide) is less than about 1,000 prior to curing and about 50 to about 400, preferably about 75 to about 300, after curing, where the melt flow is determined using ASTM D 1238 Condition 316/5 modified to use a 5 minute preheat time.

The polyolefin polymer incorporated in the poly(arylene sulfide) polymer according to this invention is prepared from at least one branched olefin monomer having from 4 to 12 carbon atoms. Suitable examples of such monomers include, but are not limited to 3-methyl-1-butene (3MB1), 3-methyl-1-pentene (3MP1), 4-methyl-1-pentene (4MP1), 4-methyl-1-hexene (4MH1), 3,3-dimethyl-1-butene (3,3DMB1), 4,4-dimethyl-1-hexene (4,4DMN1), and other similar monomers. The polyolefin polymer can be prepared by any method known to those of ordinary skill in the art. The polyolefin polymer can be a homopolymer or it can be a copolymer prepared from two of the above-described olefins or one of the above-described olefins and from 1 to 10 mole percent based on the total moles of monomers of an $\alpha$-olefin having 2 to 18 carbon atoms. Longer chain linear olefins are preferred for use as comonomers in that they are easier to copolymerize with higher, branched alpha-olefins and can impart increased clarity, stability, and impact strength to the resultant polymer. Exemplary comonomers include, but are not limited to, 1-octene, 1-decene, 1-dodecene, 1-tetradecene, 1-hexadecene, and other higher linear olefins.

It is presently preferred to employ a poly(4-methyl-1-pentene) homopolymer or a poly(4-methyl-1-pentene/1-decene) copolymer as the polyolefin polymer.

The amount of polyolefin polymer incorporated in the poly(arylene sulfide) polymer is generally in the range of about 0.1 to 3 weight percent, based on the total weight of the composition. It is preferred to use an amount of the polyolefin polymer in the range of 0.25 to 1 weight percent.

In addition to the mold release effect of the polyolefin polymer, it is noted that the polyolefin polymer contributes as a flash reducing agent. It can therefore be used in place of, or in addition to, conventional mold release agents in molding compositions. For example, the high density polyethylene (a known mold release agent) can be replaced with the polyolefin polymer poly(4-methyl-1-pentene) according to this invention, resulting in a molding composition with improved mold release and a reduced tendency to flash.

Molding compositions typically contain minor to large amounts of fibrous reinforcing materials. Such materials are generally selected from carbon fibers, polymer fibers, glass fibers and the like. While any suitable type of fiber can be used in this invention, it is preferred to use glass fibers in this invention due to availability and lower cost.

The glass fiber which can be employed in this invention can be chosen from any of those products commercially available which are typically used as fillers and reinforcing agents in polymeric compositions. Generally, glass fibers of about ⅛ to about 2 inches in length are employed in the invention composition.

The glass fiber employed in the composition generally will have a diameter of less than about 13 microns. The presently preferred glass fiber is G-filament type glass fiber. An example of a G-filament type glass fiber is Owens Corning 497EE which has an average diameter of about 9 microns.

The glass fiber is generally present in an amount of about 5 to 60, preferably about 30 to about 50 weight percent and most preferably about 35 to about 45 weight percent based on the total composition.

Other additives and components can be optionally be incorporated in the composition of this invention in order to achieve desired properties in the molding composition.

For example, hydrotalcites can be employed in this invention as mold corrosion inhibitors. The hydrotalcites employed in this invention can be natural or synthetic materials which correspond roughly to naturally-occurring materials having chemical structures such as $Mg_6Al_2(OH)_{16}CO_3.4H_2O$ or $Al_2O_3.6MgO.CO_2.12H_2O$. Although the magnesium/aluminum hydrates are the most common cationic species for the hydrotalcites, various metals can be substituted. For example, magnesium can be replaced by calcium zinc, copper, manganese, lithium or nickel; aluminum can be replaced by chromium (plus 3) or iron. The anionic species can vary, with carbonate or phosphate the most likely candidates. The most readily available hydrotalcite compounds will be magnesium-aluminum hydroxy carbonate hydrates. The preferred hydrotalcite compound is magnesium aluminum hydroxy carbonate hydrate, which is available under the commercial name DHT-4A sold by Kyowa Chemical Industry Company, Ltd., Osaka, Japan, which is characterized by the manufacturer as $Mg_{4.5}Al_2(OH)_{13}CO_3.3.5\ H_2O$.

The amount of hydrotalcite optionally employed in the present invention is generally in the range of 0.05 to 3.0 weight percent, more preferably 0.10 to 2.0 weight percent of the total composition.

Nucleating agents can also be employed in this invention. Suitable nucleating agents which can be employed in this invention are any additive which is effective to achieve the desired crystalline morphology modification of the poly(arylene sulfide). Usually the agent will comprise a polymer-containing additive since polymers are expected to be readily compatible with the other components. Usually, the agent will also be crystallizable and have a high crystalline melt point. The preferred nucleating agents are polyaryl ketones such as, for example; poly(arylene sulfide-ketone)s and poly ether ketones. It is preferred that the polyaryl ketone have a melting point of at least about 20° C. above the melting point of the poly(arylene sulfide) and more preferably at least about 40° to about 100° C. above the poly(arylene sulfide) melting point.

The most preferred nucleating agent is a poly(ether ether ketone) such as, for example, poly(1,4-oxyphenyloxy-p,p'-(benzophenone). This polymer is presently commercially available from ICI.

The amount of nucleating agent optionally present in the invention composition is generally in the range of 0.01 to 3.0 weight percent, more preferably 0.05 to 2.0 weight percent of the total composition.

The compositions of the invention can also contain an organosilane compound selected from the group of epoxy functional silanes. The preferred epoxy functional silane is gamma-glycidoxypropyltrimethoxysilane.

Such organosilanes, if employed, will generally be present in an amount of from about 0.01 to about 2 weight percent, and most preferably from about 0.6 to about 1.0 weight percent based on the weight of the total composition.

Pigments can be employed, if desired, in this invention. The pigments which can be employed in the invention composition are those known to those of ordinary skill in the art, which can tolerate the relatively high processing temperatures required, e.g. 600° F., for poly(arylene sulfide). Typical examples include titanium dioxide, iron oxide, cadmium sulfide, phthalocyanine blue, carbon black and the like and mixtures thereof.

The amount of pigment used, if present, is typically in the range of 0.01 to 10.0 weight percent, preferably 0.05 to 2.0 weight percent of the total composition.

The compositions of this invention can be made in accordance with any method wherein the poly(arylene sulfide), polyolefin and other components are combined to form a mixture. Many suitable methods are well known to those skilled in the art. By way of example, the components of the composition can be mixed together at room temperature in a rotating drum blender or in an intensive mixer, such as a Henschel mixer, and then the mixture can be extrusion compounded and pelletized at a temperature above the melting point of the poly(arylene sulfide) to produce a relatively uniform composition.

Once made, the compositions of the invention can be used to form molded articles in accordance with any method suitable for molding thermoplastic compositions. Such methods are well known in the art. The compositions can, for example, be introduced into an injection molding apparatus to produce a melt which is extruded into an injection mold wherein the molded article is formed.

The following examples are provided in order to further illustrate the invention and are not meant to limit the scope thereof.

EXAMPLE 1

This example demonstrates the beneficial effect on mold release of the use of the polyolefin poly(4-methyl-1-pentene) (PMP) in fiberglass reinforced poly(phenylene sulfide) (PPS) injection molding compounds. The PPS used was, in all cases, made using techniques disclosed in U.S. Pat. No. 3,354,129. In this example the PPS used a melt flow rate of 144 g/10 min. when measured according to ASTM D 1238 Condition 316/5, modified to use a 5 min. preheat. The PPS was compounded, using conventional techniques known to those skilled in the art, with 40 weight percent fiberglass, OC 497EE from Owens Corning, 1.0 weight percent lithium carbonate and from zero to 0.25 weight percent of the desired mold release agent. For compound 1, no mold release agent was added. For compound 2, 0.25 weight percent of a high density polyethylene, Marlex® high density polyethylene Grade TR-161, from Phillips 66 Company having a nominal melt index of 30 when measured using ASTM D 1238-86 Condition 190/2.16, was added. For compound 3, 0.25 weight percent of a PMP homopolymer was added. The PMP used had a nominal flow rate of 20 g/10 min. when measured according to ASTM D-1238-86 Condition 260/5 and a nominal density of 0.835 g/cc, and was stabilized with low levels of Irganox 1010 (Ciba Geigy), zinc stearate and dilaurylthiopropionate. For compound 4, 0.1 weight percent of the PMP homopolymer was added. The characteristics of the PPS and formulations of the compounds are set forth in Table I.

TABLE I

| Compound | PPS wt. % | Glass Fiber wt. % | LiCO$_3$ wt % | Mold Release Agent | | Compound[a] Viscosity (K poise) |
|---|---|---|---|---|---|---|
| | | | | HDPE wt. % | PMP wt. % | |
| 1 | 59.0 | 40 | 1.0 | — | — | 2.33 |
| 2 | 58.75 | 40 | 1.0 | 0.25 | — | 2.33 |
| 3 | 58.9 | 40 | 1.0 | — | 0.1 | 2.46 |
| 4 | 58.75 | 40 | 1.0 | — | 0.25 | 2.31 |

[a]Compound viscosity measured using a Keynes Capillary Viscometer at 316° C., results given in K poise at 400 1/sec.

Each of these compounds was injection molded using a Newbury 75 tonne, vertical injection molder using a barrel temperature of 600° F., a variable pressure, an injection rate of 1.8 inch/sec and a mold temperature of 300° F. In each case, the force required to eject the molded parts was measured as a function of the cooling time in the mold. The results are shown in FIG. 1. It can be seen from FIG. 1 that the force required to eject the parts containing 0.25 weight percent PMP is less at all cooling rates than that required to eject parts containing either no mold release agent or 0.25 weight percent polyethylene mold release agent.

EXAMPLE 2

This example demonstrates the beneficial effect on flashing which occurs when a low level of PMP is incorporated into fiberglass reinforced PPS injection molding compounds.

In all cases, the PPS was made using techniques disclosed in U.S. Pat. No. 3,919,177. The PPS used to prepare compounds 5 and 6 was a blend of two polymers prepared according to the methods disclosed in U.S. Pat. No. 3,919,177, then acid-washed according to the method disclosed in U.S. Pat. No. 4,801,664, then lightly cured. The first PPS polymer (A) had a flow rate of 233.4 g/10 min., the second (B) had a flow rate of 100.2 g/10 min. The PPS was compounded, using conventional equipment and techniques known to those skilled in the art, with amounts of fiberglass and certain other additives which were the same for both compounds of this example. The glass fiber used was that used in example I, the polyethylene used was that used in Example I. The compound did not contain LiCO$_3$ but did contain an organosilane, Union Carbide TC-100 gamma-glycidoxypropyltrimethoxy silane; Carbon Black N110 from Phillips 66 Company; a poly(ether ether ketone) (PEEK) from ICI, and a hydrotalcite, DHT-4A from Kyowa Chemical Industry Co., Polymer Ltd. In addition, compound 5 contained 0.25 weight percent of a high density polyethylene while compound 6 contained, instead, 0.25 weight percent of a PMP homopolymer. Table II shows the formulations and characteristics of compounds 5 and 6.

TABLE II

| Compound | PPSA wt % | PPSB wt % | Glass Fiber wt % | Organo-Silane wt % | Carbon Black wt % | PEEK wt % | Hydrotalcite wt % | HDPE wt % | PMP wt % | Compound Visc. (K poise) |
|---|---|---|---|---|---|---|---|---|---|---|
| 5 | 43.0 | 14 | 40 | 0.80 | 0.5 | 0.45 | 1.0 | 0.25 | — | 2.85 |

TABLE II-continued

| Compound | PPSA wt % | PPSB wt % | Glass Fiber wt % | Organo-Silane wt % | Carbon Black wt % | PEEK wt % | Hydro-talcite wt % | HDPE wt % | PMP wt % | Compound Visc. (K poise) |
|---|---|---|---|---|---|---|---|---|---|---|
| 6 | 42.75 | 14 | 40 | 0.80 | 0.5 | 0.45 | 1.0 | — | 0.25 | 2.92 |

The two compounds were injection molded under identical conditions using a Kawaguchi KI-80 injection molder using a barrel temperature of 625° F., an injection pressure of 900 psi, an injection rate of 1.75 inch/sec, a mold temperature of 275° F. and a clamp pressure of 75 tonne. In each case, the amount of flashing was determined by measuring the distance the material invaded the mold vent. The results are shown in Table III. It can be seen from the data in Table III that compound 6, containing 0.25 weight percent PMP, flashed approximately 15 percent less than did compound 5, which contained 0.25 weight percent polyethylene.

TABLE III

Effect of PMP and Polyethylene on Flashing of PPS Compounds

|  | Additive | Level, Wt. % | Vent Intrusion, in. |
|---|---|---|---|
| Compound 5 | HDPE | 0.25 | 0.0034 |
| Compound 6 | PMP | 0.25 | 0.0029 |

While this invention has been described in detail for the purposes of illustration, it is not meant to be limited thereby, but is intended to cover all reasonable modifications within the spirit and scope thereof.

That which is claimed is:

1. A poly(arylene sulfide) composition suitable for injection molding which comprises a poly(arylene sulfide) polymer and about 5 to 60 weight percent of a fibrous reinforcing material and about 0.1 to about 3 weight percent of a polyolefin prepared from at least one branched olefin monomer having from 4 to 12 carbon atoms wherein said weight percentages are based on the total weight of said composition.

2. A composition according to claim 1 wherein said polyolefin is a poly(4-methyl-1-pentene) polymer.

3. A composition according to claim 2 wherein said poly(4-methyl-1-pentene) polymer is a homopolymer.

4. A composition according to claim 2 wherein said poly(4-methyl-1-pentene) polymer contains about 1 to 10 mole percent of a comonomer.

5. A composition according to claim 2 wherein said poly(4-methyl-1-pentene) polymer is present in an amount in the range of 0.25 to 1 weight percent of said composition.

6. A composition according to claim 1 wherein said fibrous reinforcing material comprises glass fibers.

7. A composition according to claim 6 wherein said poly(arylene sulfide) polymer is an essentially linear, high molecular weight polymer.

8. A composition according to claim 7 wherein said poly(arylene sulfide) polymer is an acid-treated, cured polymer.

9. A composition according to claim 6 wherein said poly(arylene sulfide) polymer is a relatively low molecular weight cured polymer.

10. A poly(arylene sulfide) composition which consists essentially of
a) 30 to 70 weight percent of a linear, high molecular weight poly(arylene sulfide) polymer;
b) 29.9 to 50 weight percent glass fibers;
c) 0.25 to 1 weight percent of a polyolefin prepared from a branched olefin having 4 to 12 carbon atoms;
d) 0.05 to 3 weight percent of a hydrotalcite;
e) 0.01 to 3 weight percent of a nucleating agent;
f) 0.01 to 2 weight percent of an organosilane; and
g) 0 to 10 weight percent of a pigment, wherein said weight percentages are based on the total weight of said composition.

11. A composition according to claim 10 wherein said poly(arylene sulfide) polymer is an acid-treated, cured polymer.

12. A composition according to claim 10 wherein said polyolefin is poly(4-methyl-1-pentene).

13. A composition according to claim 10 wherein said poly(4-methyl-1-pentene) polymer is a homopolymer.

14. A composition according to claim 12 wherein said poly(4-methyl-1-pentene) polymer is a copolymer containing about 1 to 10 mole percent of a comonomer.

15. A composition according to claim 10 wherein said glass fiber has a length in the range of about ⅛ to 2 inches and a diameter of less than 13 microns.

16. A composition according to claim 10 wherein said hydrotalcite is selected from the group consisting of natural and synthetic materials containing magnesium, aluminum, calcium, zinc, copper, manganese, lithium, nickel, or chromium cations.

17. A composition according to claim 16 wherein said hydrotalcite is characterized by the structure $Mg_{4.5}Al_2(OH)_{13}CO_3 \cdot 3.5\ H_2O$.

18. A composition according to claim 10 wherein said nucleating agent is a polymer-containing additive.

19. A composition according to claim 18 wherein said nucleating agent is selected from the group consisting of polyarylketones and poly(arylene sulfide ketone)s.

20. A composition according to claim 19 wherein said nucleating agent is a poly(ether ether ketone) polymer.

21. A composition according to claim 10 wherein said organosilane is an epoxy functional silane.

22. A composition according to claim 21 wherein said epoxy functional silane is gamma-glycidoxypropyltrimethoxysilane.

23. A composition according to claim 10 wherein said pigment is present and is carbon black.

24. A method for preparing a composition useful for injection molding comprises incorporating in a poly(arylene sulfide) composition in about 0.1 to 3 weight percent of a polyolefin polymer prepared from at least one branched olefin monomer having about 4 to 12 carbon atoms, wherein said weight percentages are based on the total weight of the composition.

25. A method according to claim 24 wherein said polyolefin polymer is poly(4-methyl-1-pentene) polymer.

26. A method according to claim 25 wherein said poly(4-methyl-1-pentene) polymer is a homopolymer.

27. A method according to claim 25 wherein said poly(4-methyl-1-pentene) polymer is a copolymer containing about 1 to 10 mole % of a comonomer.

28. A method according to claim 25 wherein about 0.25 to about 1 weight percent of said poly(4-methyl-1-pentene) is incorporated in said poly(arylene sulfide) polymer.

29. A method according to claim 28 wherein said poly(arylene sulfide) polymer is a linear, high molecular weight polymer.

30. A method according to claim 24 wherein said poly(arylene sulfide) polymer is subjected to a curing step.

* * * * *